(12) United States Patent
Kiest, Jr. et al.

(10) Patent No.: US 8,721,216 B2
(45) Date of Patent: *May 13, 2014

(54) METHOD OF REPAIRING A MANHOLE CHIMNEY USING A STRETCHABLE SLEEVE

(75) Inventors: Larry W. Kiest, Jr., Ottawa, IL (US); Jason Bartlett, Lamar, MO (US); Thomas M. O'Sullivan, III, Lamar, MO (US); Raymond L. Greek, Oronogo, MO (US); Timothy L. Back, Cincinnati, OH (US); Donald L. Betzold, Marseilles, IL (US)

(73) Assignees: LMK Enterprises, Inc., Ottawa, IL (US); O'Sullivan Trenchless Installation Services, Lamar, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/571,707

(22) Filed: Oct. 1, 2009

(65) Prior Publication Data
US 2010/0018631 A1 Jan. 28, 2010

Related U.S. Application Data

(63) Continuation of application No. 11/286,652, filed on Nov. 23, 2005, now Pat. No. 7,670,086.

(51) Int. Cl.
*F16L 55/162* (2006.01)

(52) U.S. Cl.
USPC ............................ 404/75; 405/184.2

(58) Field of Classification Search
CPC ...................................... F16L 55/18
USPC ........ 405/184.1, 184.2; 404/25, 72, 75; 52/21
See application file for complete search history.

(56) References Cited

U.S. PATENT DOCUMENTS

| 2,695,255 | A | 11/1954 | Avery |
| 3,745,738 | A | 7/1973 | Singer |
| 4,135,958 | A | 1/1979 | Wood |
| 4,366,012 | A | 12/1982 | Wood |
| 4,456,401 | A | 6/1984 | Williams |
| 4,602,974 | A | 7/1986 | Wood et al. |

(Continued)

FOREIGN PATENT DOCUMENTS

| AU | 15191/95 | 6/1995 |
| DE | EP 0887584 A | 12/1998 |

(Continued)

OTHER PUBLICATIONS

PCT/US2006/040380, International Search Report, LMK Enterprises, Inc., Feb. 15, 2007 (5 pages).

*Primary Examiner* — Raymond W Addie
(74) *Attorney, Agent, or Firm* — McKee, Voorhees & Sease, P.L.C.

(57) ABSTRACT

A method of repairing and renewing a manhole chimney utilizes a circumferentially stretchable liner sleeve which is inserted into the manhole and pressed by an inflatable bladder into engagement with the walls of the manhole chimney. The sleeve is coated with an uncured resin, which is allowed to cure as the sleeve is pressed against the chimney walls, thereby attaching the sleeve to the walls of the manhole chimney. The stretchable sleeve eliminates air spaces between the sleeve and the chimney walls, and precludes formation of undesirable folds in the sleeve. The sleeve stretches circumferentially up to 150% of its unstretched diameter, while having a substantially unstretchable length.

12 Claims, 8 Drawing Sheets

(56) References Cited

U.S. PATENT DOCUMENTS

| | | | |
|---|---|---|---|
| 4,685,983 A | 8/1987 | Long, Jr. | |
| 4,956,041 A * | 9/1990 | Miyazaki et al. | 156/267 |
| 4,957,389 A | 9/1990 | Neathery | |
| 5,081,802 A | 1/1992 | Westhoff et al. | |
| 5,106,440 A * | 4/1992 | Tangeman | 156/94 |
| 5,168,682 A | 12/1992 | Rye | |
| 5,265,981 A | 11/1993 | McNeil | |
| 5,405,218 A | 4/1995 | Hyde-Smith | |
| 5,415,499 A | 5/1995 | Hyde-Smith et al. | |
| 5,490,744 A | 2/1996 | McNeil | |
| 5,501,248 A | 3/1996 | Kiest, Jr. | |
| 5,510,078 A * | 4/1996 | Smith et al. | 264/516 |
| 5,653,555 A * | 8/1997 | Catallo | 405/184.2 |
| 5,736,077 A | 4/1998 | Kamiyama et al. | |
| 5,762,450 A | 6/1998 | Schmager | |
| 5,794,663 A | 8/1998 | Kiest, Jr. et al. | |
| 5,816,293 A | 10/1998 | Kiest, Jr. | |
| 5,879,501 A | 3/1999 | Livingston | |
| 5,915,886 A | 6/1999 | McNeil | |
| 5,950,682 A | 9/1999 | Kiest, Jr. | |
| 5,964,249 A | 10/1999 | Kiest, Jr. | |
| 5,971,031 A | 10/1999 | Kamiyama et al. | |
| 5,997,006 A | 12/1999 | Westhoff et al. | |
| 6,018,914 A | 2/2000 | Kamiyama et al. | |
| 6,019,136 A | 2/2000 | Walsh et al. | |
| 6,021,815 A | 2/2000 | Kiest, Jr. et al. | |
| 6,056,017 A | 5/2000 | Kamiyama et al. | |
| 6,105,619 A | 8/2000 | Kiest, Jr. | |
| 6,126,030 A | 10/2000 | Kamiyama et al. | |
| 6,143,394 A | 11/2000 | Patel et al. | |
| 6,199,591 B1 | 3/2001 | Kiest, Jr. et al. | |
| 6,206,993 B1 | 3/2001 | Kiest et al. | |
| 6,223,475 B1 | 5/2001 | Hume | |
| 6,254,709 B1 * | 7/2001 | Kamiyama et al. | 156/91 |
| 6,368,025 B1 | 4/2002 | McNeil | |
| 6,401,759 B1 | 6/2002 | Kamiyama et al. | |
| 6,427,726 B1 | 8/2002 | Kiest, Jr. | |
| 6,478,054 B1 | 11/2002 | Kiest | |
| 6,482,280 B1 | 11/2002 | Kiest, Jr. et al. | |
| 6,540,438 B2 | 4/2003 | De Bruijn et al. | |
| 6,540,439 B2 | 4/2003 | DeBruijn et al. | |
| 6,634,828 B1 | 10/2003 | Hovad | |
| 6,641,687 B2 | 11/2003 | Kiest, Jr. et al. | |
| 6,676,832 B2 | 1/2004 | De Bruijn et al. | |
| 7,018,691 B2 | 3/2006 | McNeil | |
| 7,083,360 B2 | 8/2006 | Kamiyama et al. | |
| 7,121,766 B2 | 10/2006 | De Bruijn et al. | |
| 7,270,150 B2 | 9/2007 | Warren | |
| 7,420,587 B2 * | 9/2008 | Davis | 348/82 |
| 7,670,086 B2 * | 3/2010 | Kiest et al. | 405/184.2 |
| 2002/0071723 A1 | 6/2002 | DeBruijn | |
| 2003/0133757 A1 | 7/2003 | DeBruijn et al. | |
| 2006/0137816 A1 | 6/2006 | Taylor et al. | |
| 2006/0207726 A1 * | 9/2006 | Driver et al. | 156/433 |
| 2008/0068601 A1 * | 3/2008 | Thayer et al. | 356/241.3 |
| 2008/0277838 A1 | 11/2008 | Hassen et al. | |

FOREIGN PATENT DOCUMENTS

| | | |
|---|---|---|
| WO | WO 95/16165 | 6/1995 |
| WO | WO 98/39521 A | 9/1998 |
| WO | WO 0068543 | 11/2000 |
| WO | WO 00/79176 A1 | 12/2000 |
| WO | WO2006/128256 A1 | 12/2006 |

\* cited by examiner

METHOD OF REPAIRING A MANHOLE CHIMNEY USING A STRETCHABLE SLEEVE

CROSS-REFERENCE TO RELATED APPLICATIONS

This application is a Continuation Application of U.S. Ser. No. 11/286,652 filed Nov. 23, 2005, now U.S. Pat. No. 7,670,086 issued Mar. 2, 2010, herein incorporated by reference in its entirety.

BACKGROUND OF THE INVENTION

Conventional manholes include a lower or bottom pan, a barrel having a constant diameter adjacent the pan, a concentric or eccentric cone extending upwardly from the barrel, one or more adjusting rings to adjust the overall height of the manhole, and a casting frame on top of the adjusting rings to support a lid at an elevation substantially level with the surrounding pavement. The casting frame is preferably sealed to the upper-most adjusting ring to preclude or minimize water flow into the manhole. The cone and adjusting rings are commonly known as the manhole chimney. Most manhole structures are unique in size and shape, with varying diameters and depths.

The upper portion of the manhole is normally the weakest portion of the structure, due to traffic loading, freeze and thaw, impact from snow plows, and deteriorated small pieces of construction materials used to make the final grade adjustment for the surrounding road. Sub-standard construction methods can also lead to damage or deterioration of the upper manhole structure. Thus, the manhole chimney is vulnerable to allowing surface water and subsidence of soil to enter the manhole, which eventually leads to a structural failure of the manhole.

One method of repairing manholes involves curved-in place liners or sleeves. Due to the dimensional differences in manholes, these prior art repair liners are custom tailored for each specific manhole structure, which necessitates personal measurements for each manhole. Often times, the person must enter the manhole to measure difficult shaped structures. Such customization inherently increases costs for the one-of-a-kind liners.

The prior art liners generally are constructed of materials such as fiberglass or needle-punched felt material and PVC. These materials offer little or no stretching, particularly circumferentially. Due to the lack of stretchability in these prior art liner sleeves, it is critical that the manhole measurements be precise, which is nearly impossible. When measurements are not precise, the liner sleeve may be too small or too large. When the sleeve is too small, an annular space is created between the liner and the manhole structure, which allows surface water or ground water to migrate and enter the manhole, which subsequently enters the water collection system. When the liner is too large, a fold is created in the liner, which produces a rough inner surface, which reduces capacity for a person entering the manhole for maintenance and provides an area upon which obstacles may snag or catch. For example, if a bladder is used to expand the liner outwardly into engagement with the manhole walls, the bladder often becomes caught on the folds, which complicates removal of the bladder.

Therefore, a primary objective of the present invention is the provision of an improved method for repairing a manhole using a stretchable liner sleeve.

Another objective of the present invention is the provision of a universal liner that can be used to repair and renew manholes having various sizes.

A further objective of the present invention is the provision of a one-size fabric liner which stretches circumferentially to various diameters up to 150% of the unstretched diameter for use in manholes of varying sizes and shapes.

Another objective of the present invention is the provision of a method of repairing a manhole chimney by inserting a resin-impregnated sleeve into the chimney and stretching the sleeve circumferentially into engagement with the chimney, and then allowing the resin to cure in place so as to bond the sleeve to the chimney.

Another objective of the present invention is the provision of a method for repairing a manhole chimney using a sleeve which is inserted into the chimney and pressed into contact with the chimney, with the insertion and pressing steps being sequential or simultaneous.

A further objective of the present invention is the method of repairing a manhole chimney using a resin-coated sleeve which eliminates space between the sleeve and the chimney and which precludes folds in the sleeve after the sleeve is attached to the chimney.

Still another objective of the present invention is the provision of a stretchable liner for repairing manhole chimneys which is economical to manufacture, easy to install, and durable in use.

These and other objections will become apparent from the following description of the invention.

BRIEF SUMMARY OF THE INVENTION

The present invention provides a trenchless method for renewing and repairing a chimney section of a manhole, so as to eliminate surface water and surrounding soil from entering the collection system of the manhole. The manhole chimney repair method of the present invention utilizes a stretchable liner that conforms to changing and varying sizes in each manhole structure. The universal, one-size liner can be stretched circumferentially up to 150% of its unstretched diameter, thereby accommodating nearly all manhole chimneys. The method of repairing the manhole chimney using the stretchable liner eliminates the need to measure any portion of the manhole. The stretchable nature of the liner assures that when the repair process is complete, no annular spaces exist between the liner and the chimney wall, and no folds exist in the liner so as to provide a smooth, wrinkle-free interior surface for the chimney. The liner sleeve is stretched using fluid pressure acting directly on the interior of the sleeve or through an inflatable bladder inserted into the sleeve.

DETAILED DESCRIPTION OF THE PREFERRED EMBODIMENT

Figure 1:
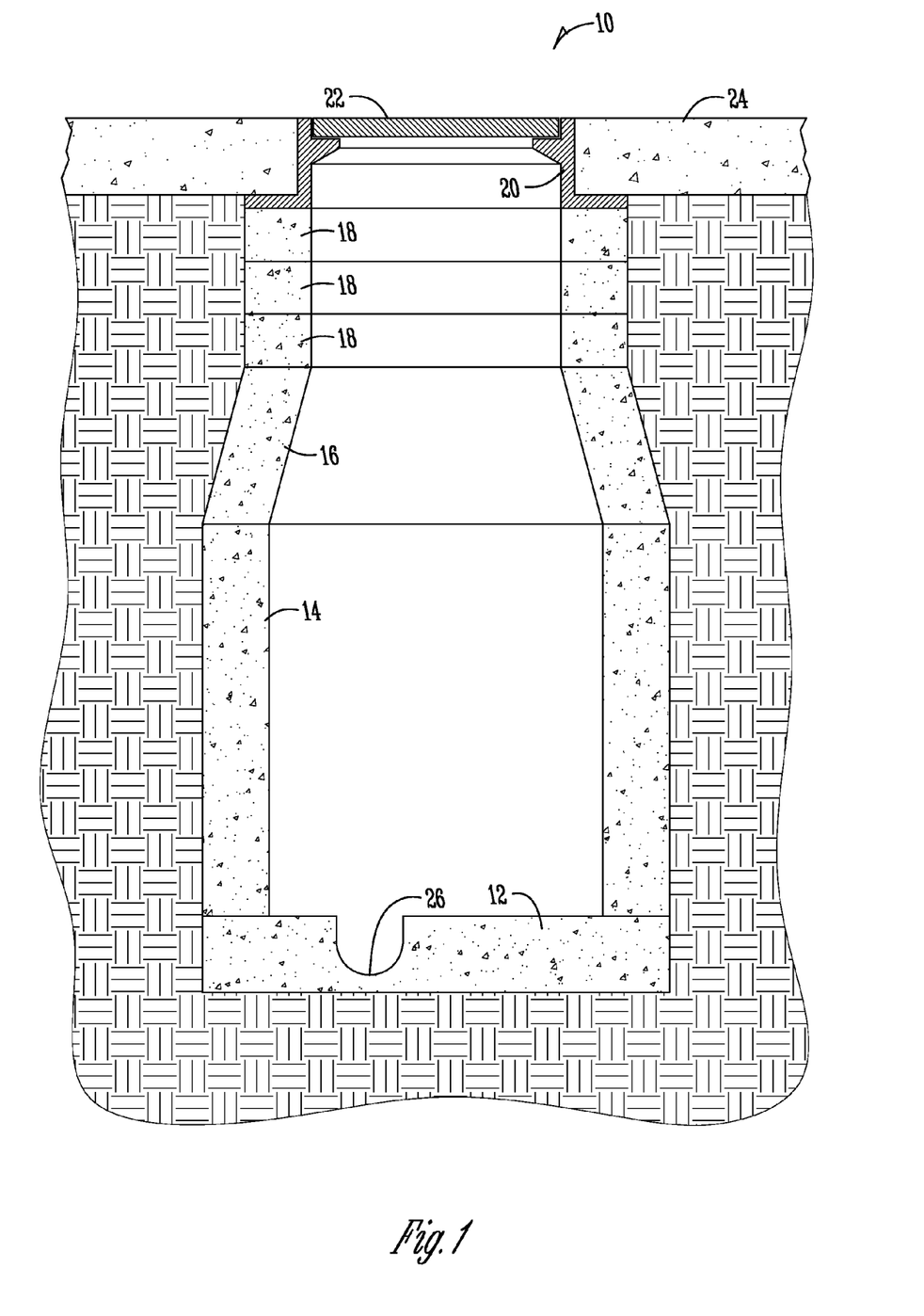
FIG. 1 is a cross-sectional view of a manhole having an eccentric cone, before the repair process of the present invention takes place.

FIG. 1 shows a cross-sectional view of a manhole 10. The manhole 10 includes a bottom pad 12, a barrel 14 above the bottom pad 12, a cone 16 supported by the barrel 14, and a plurality of adjusting rings 18 supported by the cone 16. A casting frame 20 resides upon the upper most ring 18 and supports a lid 22. The casting 20 is normally sealed to the top ring 18. It is understood that one or more rings 18 may be used to adjust the height of the manhole 10 such that the lid 22 is substantially at the level of the pavement 24 surrounding the manhole 10. Also, while FIG. 1 shows the cone to have an eccentric shape, it is understood that a concentric cone can be utilized such that the manhole 10 has a symmetrical cross-sectional appearance. FIG. 1 also shows an optional pipe invert 26 in the bottom pad 12. While each manhole generally has unique size and shape, it is generally understood that the basic construction of the manhole 10 is similar in all manholes. The cone 16 and rings 18 generally define the chimney of the manhole 10.

The present invention is directed towards a method of repairing and renewing the manhole chimney using a stretchable liner. The liner is formed by a tubular sleeve 28 including a fabric fiber material 30 which can be stretched circumferentially up to 150% of its non-stretched diameter. The sleeve 28 has substantially no longitudinal stretching characteristics along its length. A preferred fabric for the sleeve 28 is a material known as "stitch bond" distributed by LMK Enterprises, Inc. of 1779 Chessie Lane, Ottawa, Ill. 61350. The fabric is preferably coated on one side with an impermeable polymer film 32 such as polyurethane, PVC, or similar coatings having an elastic characteristic. The sleeve 28 is constructed to a generic size or diameter that accommodates most manhole chimneys. The sleeve 28 may have a significant length which can be cut to the appropriate length at the manhole site.

Figure 2:
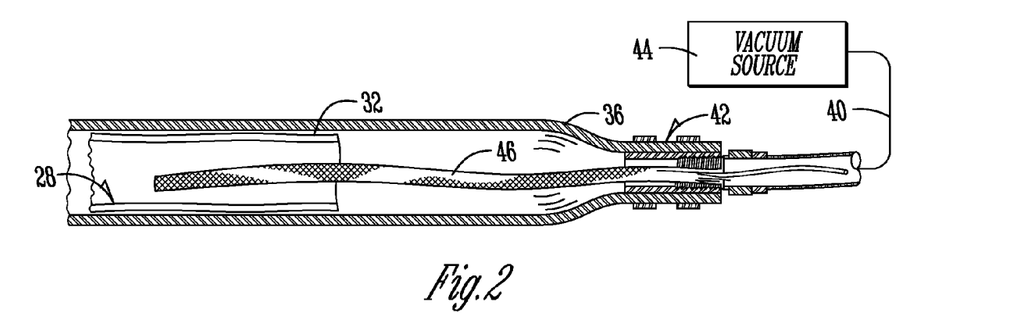
FIG. 2 is a sectional view of the liner sleeve of the present invention ready for impregnation of a thermal-set resin into the fabric fibers of the sleeve using a vacuum process.
Figure 3:
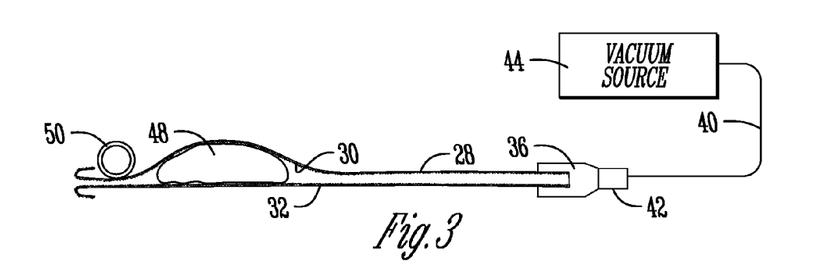
FIG. 3 is a schematic view showing the vacuum impregnation process for the resin.

The sleeve 28 is impregnated with a resin, preferably a thermal-set resin, which is forced into the fabric fibers. A method of impregnating the sleeve 28 with the resin is shown in FIGS. 2-5. More particularly, as originally formed, the fabric fibers 30 of the sleeve 28 are on the inside of the sleeve, while the film coating 32 is on the exterior of the sleeve 28. One end of the sleeve 28 is connected to a vacuum bag 36 using tape or other adhesive 38. The opposite end of the vacuum bag 36 is connected to a vacuum hose 40 through a threaded coupling 42. The vacuum hose is connected to a vacuum source 44, as seen in FIGS. 2 and 3. A wick 46 extends through the length of the vacuum bag 36 and functions to expel air from the sleeve 28 during the resin impregnation process.

As seen in FIG. 3, a slug 48 of resin is introduced into the open end of the sleeve 28 and is forced through the sleeve 28 so as to impregnate the fabric fibers 30. A pipe 50 may be rolled over the sleeve 28 so as to push the slug 48 through the sleeve 28. Simultaneously or alternatively, the vacuum source 44 can be actuated to pull the resin slug 48 through the sleeve 28, thereby coating and impregnating the fabric fibers 30 with the resin material.

Figure 4:
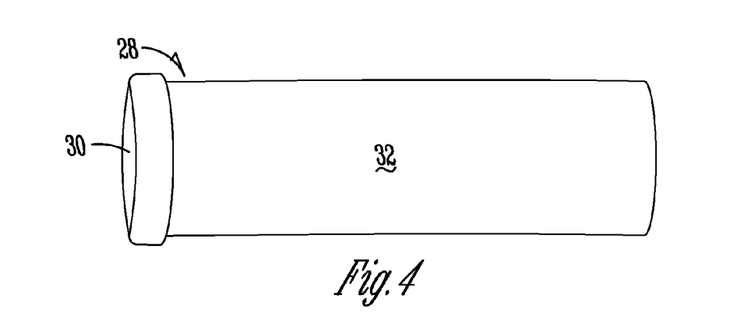
FIG. 4 is a view showing the resin-impregnated liner sleeve.
Figure 5:
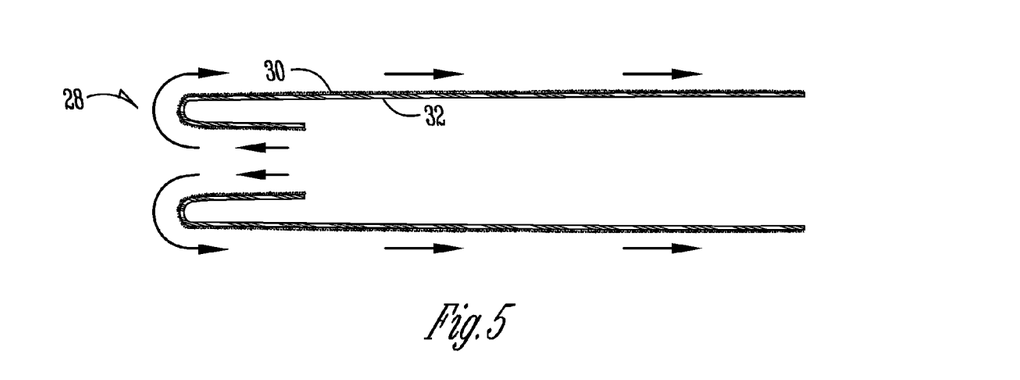
FIG. 5 is a view showing the sleeve being inverted such that the resin-coated fibers are reversed from the interior of the sleeve to the exterior of the sleeve.

After this internal impregnation process is completed, the sleeve 28 is in the form of a flattened tube, as shown in FIG. 4, with the film coating 32 on the outside and the resin coated fibers 30 on the inside. The sleeve 28 is then inverted, as shown in FIG. 5, so that the resin-coated fibers 30 are on the outside and the film coating 32 is on the inside, as shown in FIG. 5.

As an alternative to the vacuum impregnation process, the sleeve 28 can begin with the fabric fibers 30 on the exterior, and the resin poured on the fibers 30 then pressed into the fibers 30 by a person or by other means. This manual impregnation eliminates the inversion step for the sleeve 28 since the resin is applied to the exterior of the sleeve.

Figure 6:
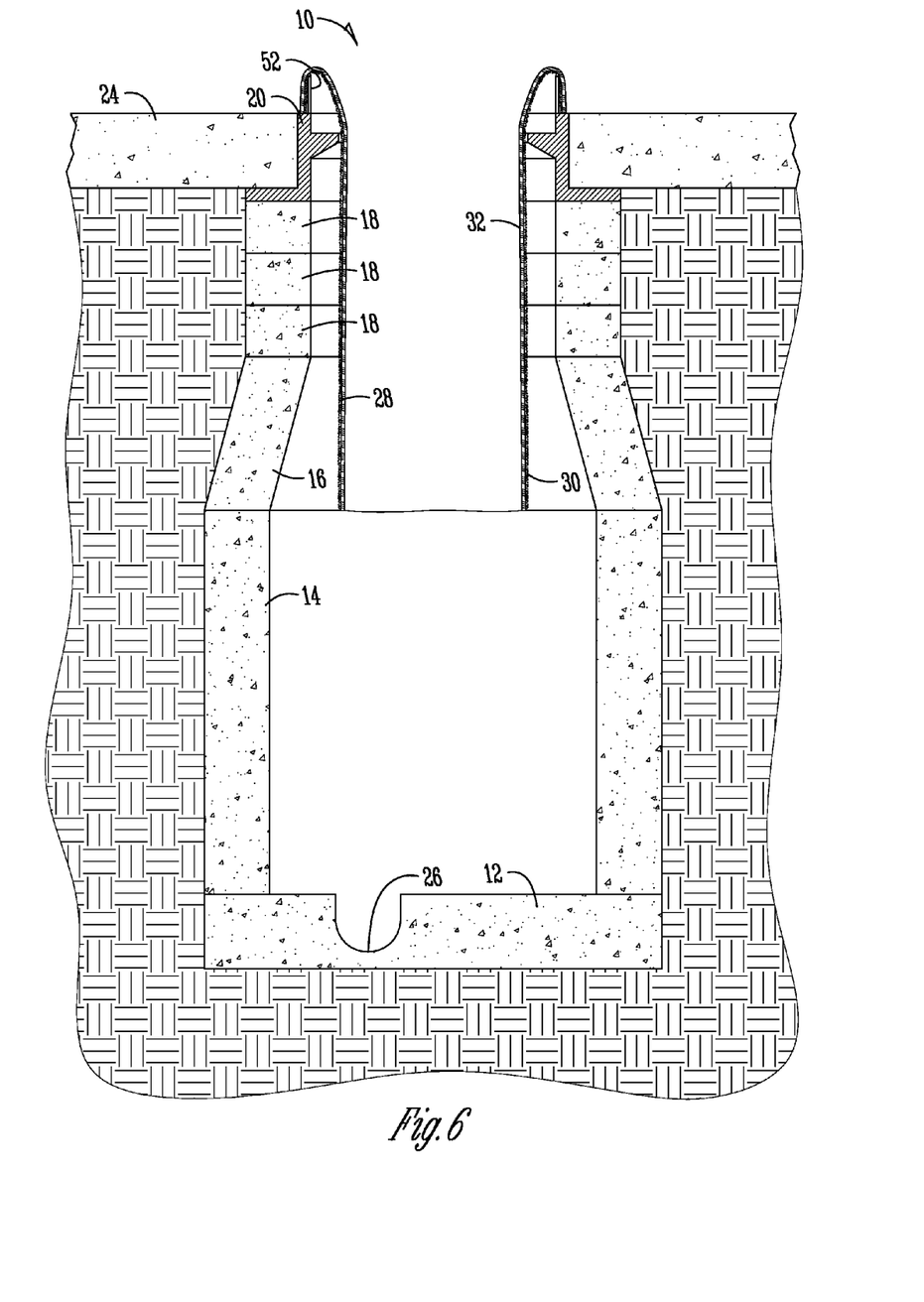
FIG. 6 is a view showing the first step of the manhole chimney repair method according to the present invention wherein the sleeve is inserted into the chimney.
Figure 7:
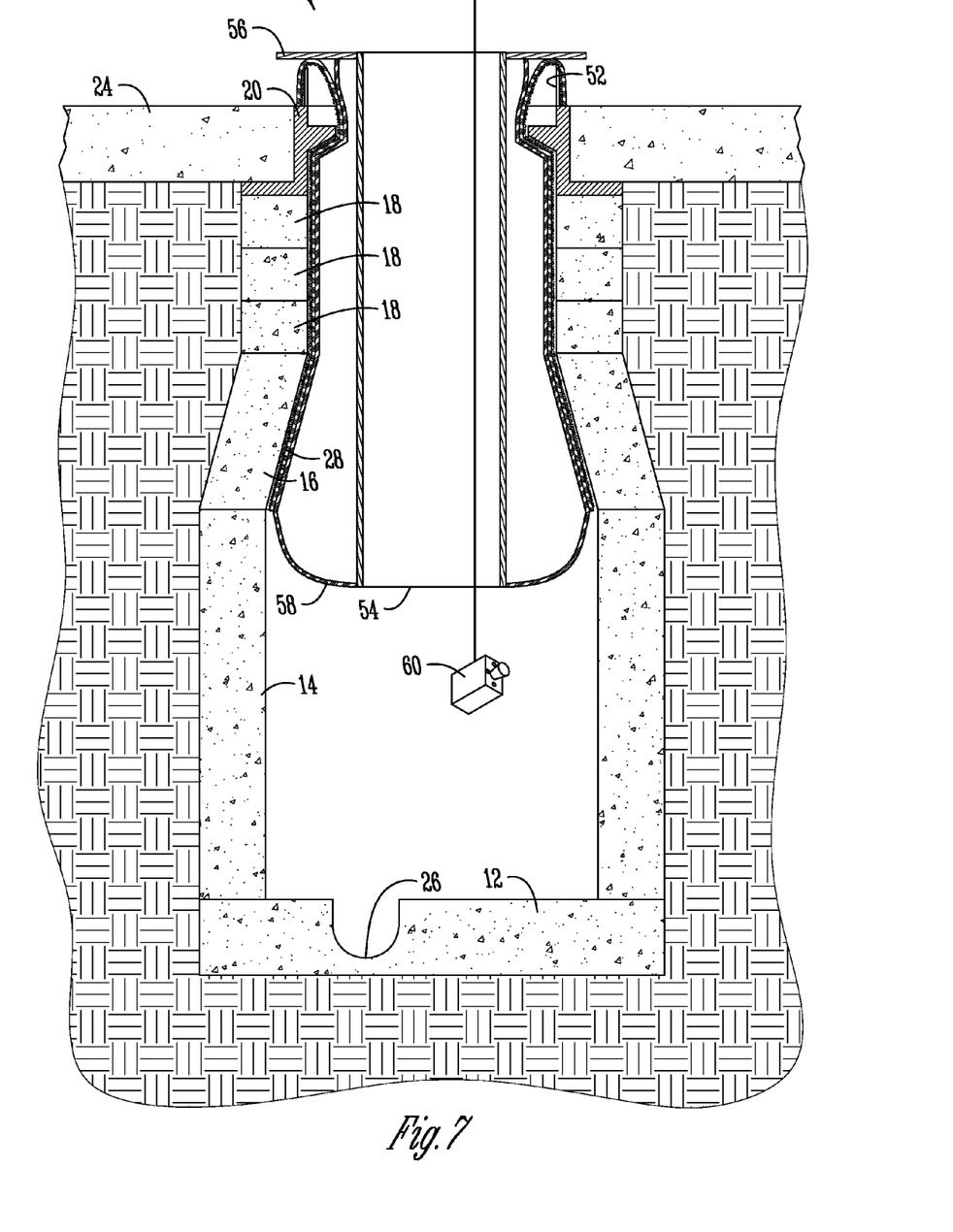
FIG. 7 is a view showing the second step of the chimney repair method of the present invention using a pipe with an inflatable bladder inserted through the sleeve to stretch the sleeve into contact with the wall of the chimney.

FIGS. 6 and 7 show a first method of repairing the manhole chimney according to the present invention. Upon arriving at the site, the sleeve 28 is cut to length, and then inverted, as described above. The manhole lid 22 is removed, and a retaining or support ring 52 is set on the pavement 24 around the opening of the manhole 10. The sleeve 28 is inserted into the manhole 10, with the upper end of the sleeve 28 being wrapped over the support ring 52 so as to retain the sleeve 28 in position. Then, as seen in FIG. 7, a large pipe 54 having a length greater than the height of the manhole chimney and a diameter smaller than the diameter of the casting frame 20 is lowered into the manhole 10 through the sleeve 28. The upper end of the pipe 54 includes a radially extending flange 56 to support the pipe on the support ring 52. As shown in FIG. 7, a camera 60 may be lowered through the pipe 54 to verify the position of the sleeve 28 and the pipe 54 within the manhole 10.

An inflatable bladder 58 extends around the perimeter of the pipe 54 and along its length. The bladder 58 is deflated when the pipe 54 is lowered into the manhole 10. After the pipe 54 and bladder 58 are in position, the bladder 58 is inflated with air or a liquid under pressure, from a convenient fluid source (not shown). As the bladder 58 inflates, the sleeve 28 is stretched circumferentially and pressed into engagement with the internal chimney wall of the manhole 10 as shown in FIG. 7. The uncured resin adheres the sleeve 28 to the cone 16 and adjustment rings 18. Upon curing of the resin, the sleeve 18 is bonded and mechanically adhered to the inner wall of the manhole chimney. The expansion of the bladder 28 assures that no annular spaces reside between the sleeve 28 and the chimney wall. Also, the stretching of the sleeve 28 from a first, unstretched diameter to enlarged diameters matching the contour of the chimney precludes undesirable folds in the sleeve 28. After the sleeve 28 has been stretched into contact with the chimney walls, the bladder 58 can be deflated, and then removed with the pipe 54 from the manhole 10. The resin may be allowed to cure with the bladder 58 inflated in the manhole 10. Alternatively, the pipe 54 and bladder 58 may be removed from the manhole before the resin is fully cured.

Figure 8:
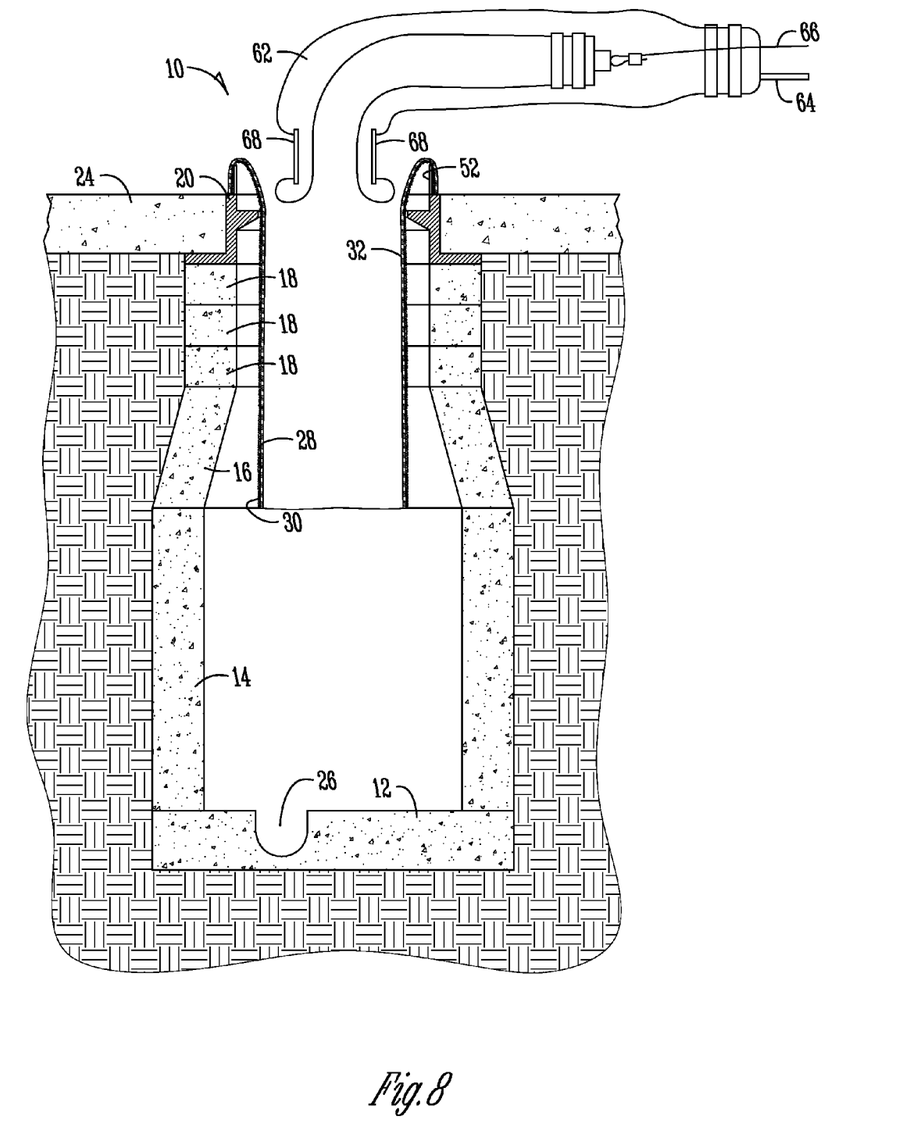
FIGS. 8 and 9 are views showing an alternative method of stretching the liner using an inflatable bladder.
Figure 9:
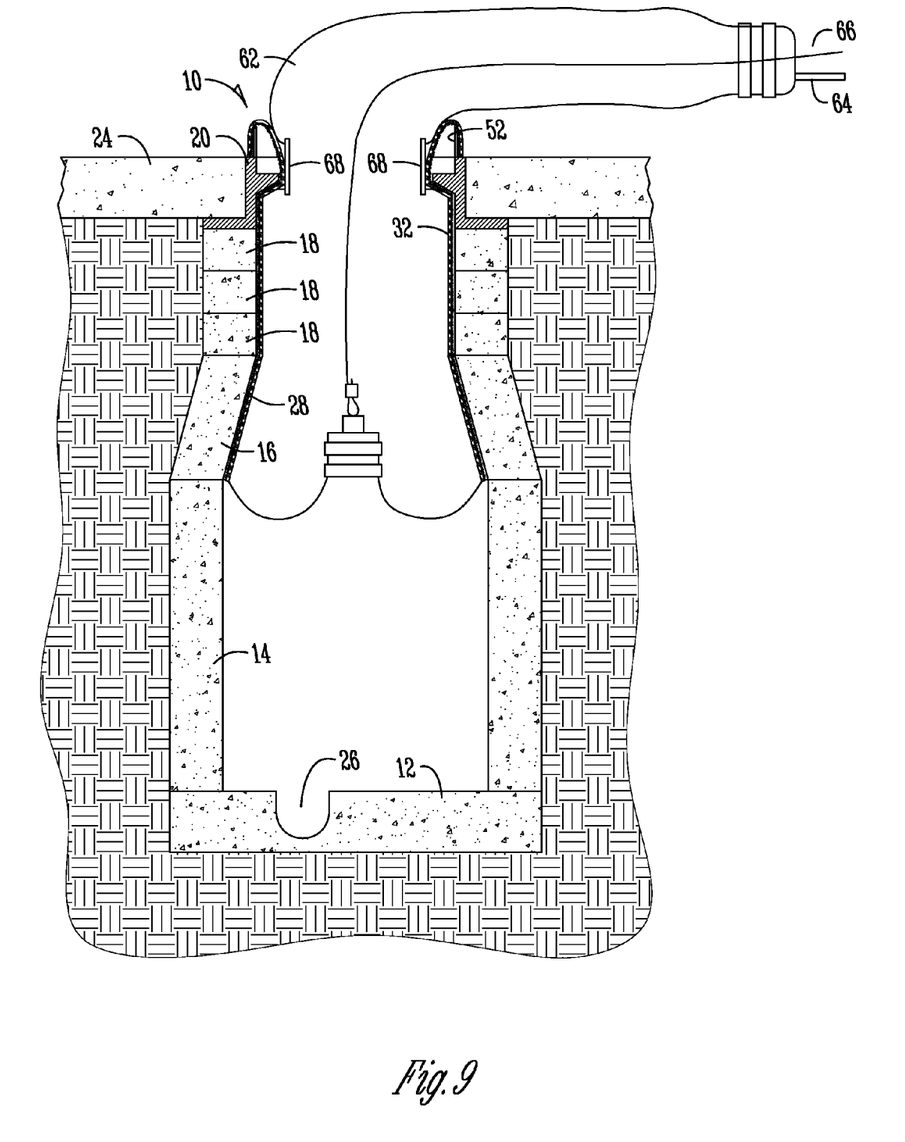

A second method of repairing the manhole 10 according to the present invention is shown in FIGS. 8 and 9. In this alternative repair process, the pipe 54 and bladder 58 is replaced with an inverted bladder 62. One end of the bladder 62 has an air inlet 64, while the opposite end of the bladder 62 includes a control rope or cord 66. A hose barb 68 is provided between the opposite ends of the bladder 62.

After the sleeve 28 is inserted into the manhole 10, as described above with respect to FIGS. 6 and 7, the deflated bladder 62 is positioned adjacent the top of the manhole 10, and then inflated such that the inverted portion of the bladder 62 is forced downwardly into the manhole 10. As inflation of the bladder 62 continues, the sleeve 28 is stretched circumferentially and pressed into engagement with the chimney walls, as described above. The bladder 62 can remain inflated while the resin cures, or can be deflated and removed from the manhole 10, before the resin cures. The rope 66 is used to pull the bladder 62 out of the manhole 10 after the bladder 62 is deflated.

Figure 10:
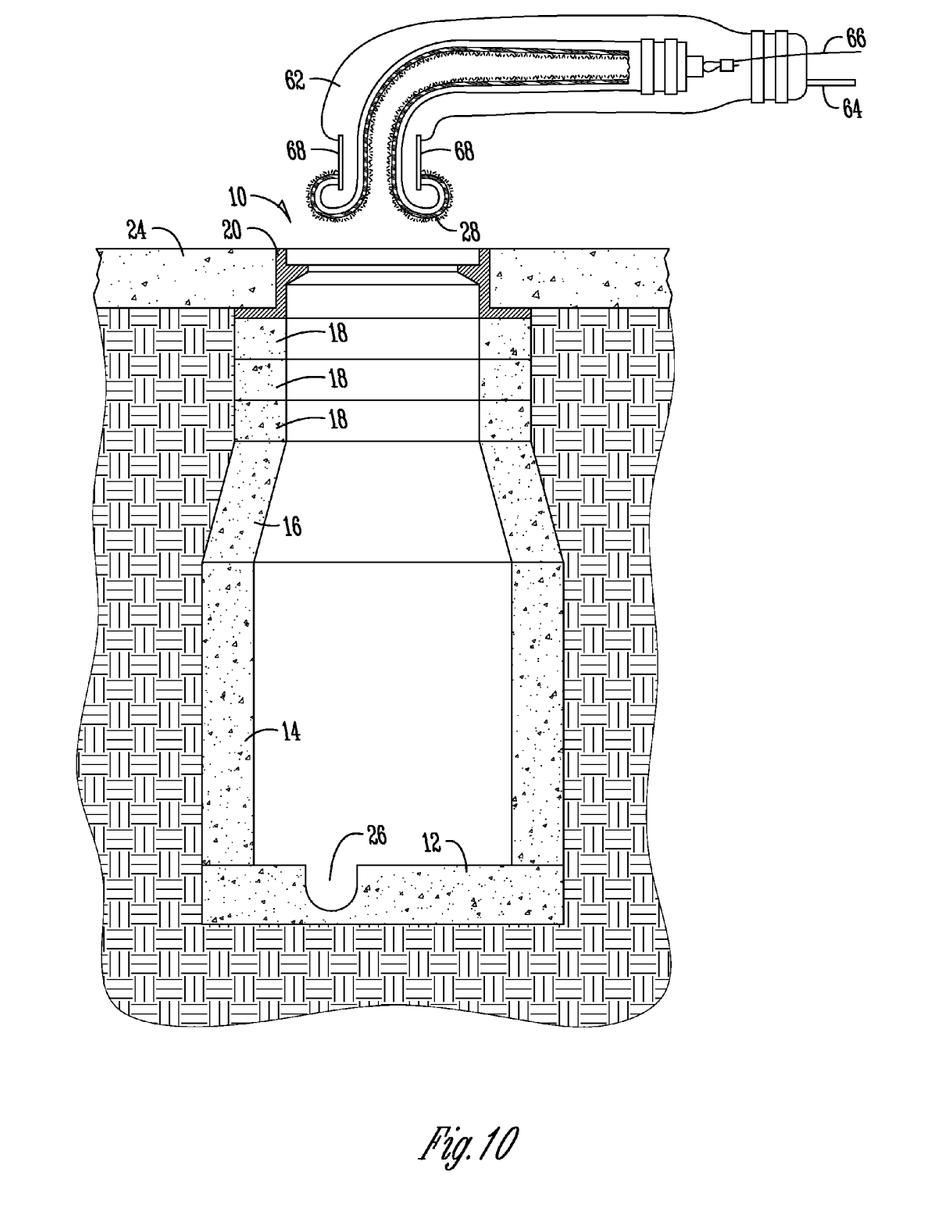
FIGS. 10 and 11 are views showing an alternative process for inserting and stretching the liner sleeve for repair of a manhole chimney.
Figure 11:
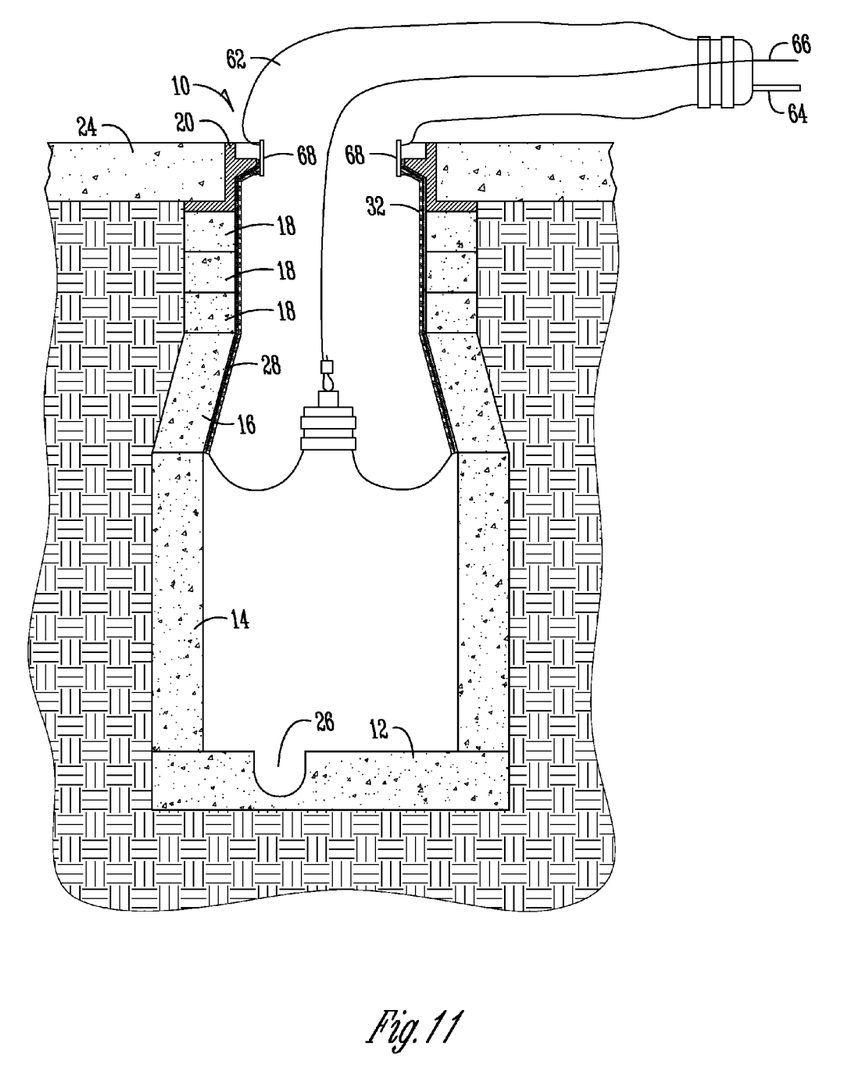

A third method of repairing the manhole 10 according to the present invention is shown in FIGS. 10 and 11. In this method, the sleeve 28 is inverted within the bladder 62. As the bladder 62 is inflated, both the sleeve 28 and the bladder 62 are forced downwardly into the manhole 10 and into engagement with the walls of the chimney. As the fluid or air pressure in the bladder 62 unfolds the inverted sleeve 28 from the position shown in FIG. 10 to the position shown in FIG. 11, the sleeve 28 rolls down into engagement with the chimney walls and is pressed against the walls by the pressure in the bladder 62.

The bladders 58, 62 preferably are made of a material that stretches up to 100% so as to conform to the various dimensions of the manhole chimney. A preferred bladder material is a gum rubber product made by American Logi Ball of Canada or by American Elastomer Products of Houston, Tex.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of repairing a wall of a manhole having varying diameters along its height, comprising:
    taking a resin-impregnable sleeve having a constant non-stretched diameter along its length with the sleeve being capable of stretching circumferentially for contact with the wall of the manhole along the varying diameters while the length of the sleeve does not substantially decrease;
    applying a resin to the sleeve;
    positioning the sleeve in the manhole;
    inserting an inflatable bladder into the sleeve;
    inflating the bladder to stretch the sleeve circumferentially into contact with the wall of the manhole along its varying diameters;
    allowing the resin to cure and harden so as to attach the sleeve to the wall of the manhole; and
    removing the bladder from the manhole.

2. The method of claim 1 wherein the bladder is inflated by applying fluid pressure within the bladder.

3. The method of claim 1 wherein the sleeve stretches up to 150% of its non-stretched diameter.

4. The method of claim 1 further comprising maintaining a first end of the sleeve outside the manhole.

5. The method of claim 1 further comprising lowering a camera through the sleeve to view the sleeve contacting the wall of the manhole at the varying diameters.

6. The method of claim 1 wherein the sleeve is inserted into the manhole by inverting the sleeve.

7. The method of claim 6 wherein the sleeve is stretched and inverted simultaneously so as to contact the wall of the manhole during insertion.

8. The method of claim 1 wherein the non-stretched diameter of the sleeve is smaller than the smallest of the varying diameters of the wall of the manhole.

9. The method of claim 1 wherein the sleeve bonds to the wall of the manhole.

10. The method of claim 1 wherein the step of applying the resin to the sleeve comprises vacuum impregnating the sleeve with the resin.

11. The method of claim 10 wherein the vacuum impregnation uses a vacuum bag attached to a first end of the sleeve and the resin is introduced into the sleeve at a second end opposite the first end, and a vacuum is applied to the bag to draw the resin through the sleeve.

12. The method of claim 1 wherein the wall of the manhole includes a structure defining a manhole chimney.

* * * * *